April 7, 1931.   F. J. SNYDER   1,799,933
FLUID PRESSURE CORE
Filed Dec. 11, 1929

INVENTOR.
Frank J. Snyder.
BY
ATTORNEY.

Patented Apr. 7, 1931

1,799,933

UNITED STATES PATENT OFFICE

FRANK J. SNYDER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

FLUID-PRESSURE CORE

Application filed December 11, 1929. Serial No. 413,219.

My invention relates to fluid pressure cores used in the repair of pneumatic tire casings and more particularly to annular cores having flat bases used in the retreading of tire casings.

In general the object of my invention is to increase the useful life of cores of this type and at the same time to improve their operation. Other and more specific objects will be apparent in the detailed description of my improved core structure which follows.

In the accompanying drawings which illustrate one embodiment of my invention,

Figure 1:
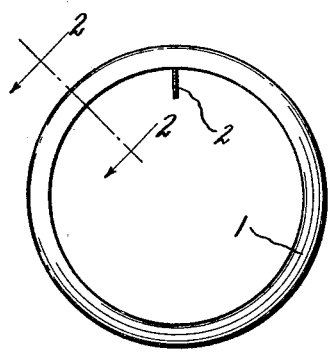
Fig. 1 is a side elevation of the core.

Referring to the drawings, 1 designates the core generally which is provided, as shown in Fig. 1, with a conventional stem 2 for the admission of fluid pressure. The function of the bag is to hold air or other fluid under pressure and to transmit the pressure to the walls of the casing in order to mold and compress the tread stock to the carcass while the tread stock is being vulcanized.

Figure 2:
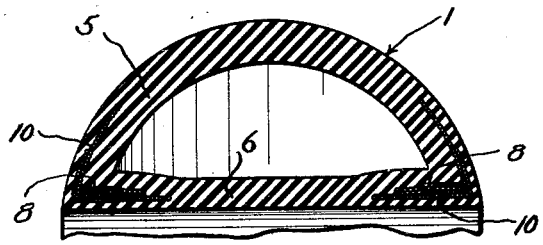
Fig. 2 is a section, on a larger scale, substantially on line 2—2 of Fig. 1.
Figure 5:
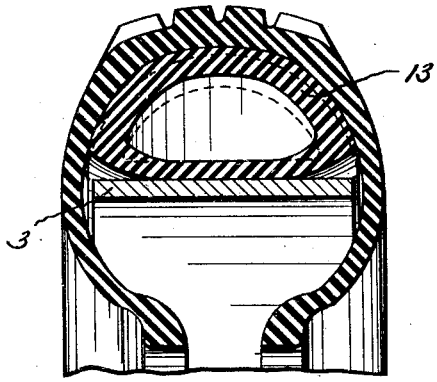
Fig. 5 is a section similar to Fig. 4 but showing, for purposes of comparison, a conventional prior art core.

The cores when placed in the casings are mounted on flat metal rings 3 which are narrower than the base of the core and since the cores are intended for use in various makes of casings, and casings having varying numbers of carcass plies, the cores must be extensible. The substantially semi-circular cross-sectional shape of cores of this type is shown in Fig. 2, and it has been customary in the past to form the cores of rubber reinforced with bias cut fabric placed either across the dome and around the corners or across the base or both. Cores so constructed have a tendency to assume a round cross-sectional shape, when internal pressure is applied, with the result that they tend to assume the shape shown in Fig. 5, that is the diameter of the corner portions is substantially increased, and this excessive distortion of the core results in a relatively rapid destruction of the core as well as uneven pressure on the walls of the tire casing. The bias cut reinforcement of the prior art, while tending generally to lessen extensibility, acts to strengthen the core against failure from this distortion. I have found, however, that the useful life of the core can be prolonged and more uniform pressure applied to the walls of the casing if the distortion of the core from its original shape is prevented as distinguished from merely attempting to strengthen the core against the results of the distortion. I have further found that having substantially eliminated the distortion I am able to make the core in general more flexible and as will later be more fully explained, I am able to preferably make the base of the core more flexible than the dome, a construction which has certain advantages but which would under prior art practice accentuate the distortion of the core.

Figure 4:
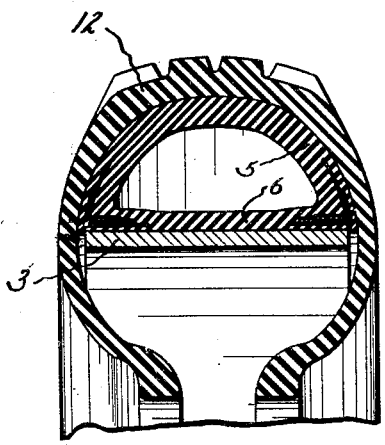
Fig. 4 is a section showing the core of my invention when positioned in a tire and inflated.

Referring to Fig. 2 which shows one practical embodiment of my invention, I have designated the dome of the core at 5, and the base at 6. Imbedded in the rubber of the base, adjacent the outer corners, I provide strips 8 of square cut square woven fabric which is substantially non-extensible in the direction of its length. The strips 8 are preferably tied into the core by offset strips of bias cut fabric 10 (preferably cord fabric) which extend a short distance up the sides of the core and beneath and slightly beyond the strips 8. This construction leaves both the dome and base free to expand but since the diameter at the corners is substantially fixed by the strips 8 the corners of the core are prevented from lifting and the base expands transversely. In Fig. 4 I have shown the core of Fig. 2 mounted on the conventional metal ring 3 and positioned in the casing 12, the outer mold being omitted. The core is shown in Fig. 4 as it appears under inflation and it will be seen that, in contrast to the prior art core designated at 13 in Fig.

5, the corners of the core are held substantially in contact with the ring, the base 6 of the core having expanded transversely to bring the corners into proper contact with the sides of the casing, the freely expansible dome portion 5 expanding uniformly against the casing walls.

The slight resilience inherent in the fabric strip 8 permits a separation of the corners of the core from the ring sufficient to relieve the friction between the base of the core and the ring which in practice is desirable but in case it is desired to hold the corners to exact diameter strands of wire or a strip of woven wire may be substituted for the square cut fabric 8. It will be understood also that various other materials may be used for the strip 8, such as cords, square cut cord fabric, hard rubber and the like, without departing from the scope of my invention.

Figure 3:
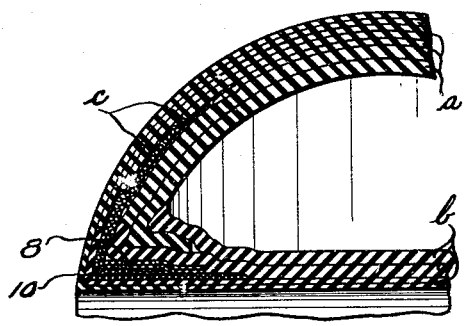
Fig. 3 is a sectional view similar to Fig. 2, but on a larger scale, showing a preferred manner of building up the core.

Cores embodying my invention may be built up in various ways depending on varying shop practice in preparing the materials. In Fig. 3 I have illustrated one method of assembly showing certain refinements of construction which I find desirable. As shown in Fig. 3 I have shown the dome of the core as built up of plies of rubber "$a$" and the base of plies of rubber "$b$", the plies "$b$" being formed of a more resilient stock than the plies "$a$" to render the base of the core the most resilient portion of the core, the edges of the strips "$a$" and "$b$" being interleaved at the corners of the core as indicated in the drawing to assure complete bonding. I also apply gum strip "$c$" to the cord strip ties 10 where they extend into the dome rubber to guard against separation as the dome flexes and expands. When the core, laid up as shown in Fig. 3, is vulcanized the various rubber strips, of course, blend to form a homogeneous unit as illustrated in Figs. 2 and 4.

Having thus described my invention, I claim:

1. A fluid pressure core, substantially semi-circular in cross-section, and means to substantially prevent an increase in the diameter of the corner portions when the core is inflated.

2. A fluid pressure core, substantially semi-circular in cross-section, the corner portions being substantially inextensible.

3. A fluid pressure core, substantially semi-circular in cross-section, the base adjacent the corners being substantially inextensible.

4. A fluid pressure core, substantially semi-circular in cross-section, provided with substantially inextensible members at the corner portions.

5. A fluid pressure core, substantially semi-circular in cross-section, provided with substantially inextensible members at the corners and reinforcing members extending around the inextensible members.

6. A fluid pressure core, substantially semi-circular in cross-section, the dome and base being freely extensible, and longitudinally inextensible members positioned at the corners.

7. A fluid pressure core, substantially semi-circular in cross-section, formed of rubber, and having strips of square cut square woven fabric positioned at the corners.

8. A fluid pressure core, substantially semi-circular in cross-section, formed of rubber, strips of square cut square woven fabric positioned at the corners, and reinforcing strips of bias cut fabric extending around the square cut square woven strips into the dome and base of the core.

9. A fluid pressure core, substantially semi-circular in cross-section, the central portions of the dome and base being formed of unreinforced rubber, strips of square cut square woven fabric positioned at the corners, and reinforcing strips of bias cut fabric extending around the square cut square woven strips and into the adjacent portions of the dome and base.

10. A fluid pressure core, substantially semi-circular in cross-section, the central portions of the dome and base being formed of unreinforced rubber, strips of square cut square woven fabric imbedded in the base adjacent the corners, and strips of bias cut cord fabric extending around the square cut square woven strips and into the adjacent portions of the dome and base.

11. A fluid pressure core, substantially semi-circular in cross-section, the central portions of the dome and base being formed of unreinforced rubber, the rubber of the base being relatively more extensible than the rubber of the dome, strips of square cut square woven fabric imbedded in the base adjacent the corners, and strips of bias cut cord fabric extending around the square cut square woven strips and into the adjacent portions of the dome and base.

FRANK J. SNYDER.